(12) United States Patent
Saarinen

(10) Patent No.: US 12,535,383 B2
(45) Date of Patent: Jan. 27, 2026

(54) METHOD OF DETECTING A BEARING FAULT

(71) Applicant: ABB Schweiz AG, Baden (CH)

(72) Inventor: Kari Saarinen, Västerås (SE)

(73) Assignee: ABB Schweiz AG, Baden (CH)

( * ) Notice: Subject to any disclaimer, the term of this patent is extended or adjusted under 35 U.S.C. 154(b) by 383 days.

(21) Appl. No.: 17/397,123

(22) Filed: Aug. 9, 2021

(65) Prior Publication Data

US 2022/0050017 A1     Feb. 17, 2022

(30) Foreign Application Priority Data

Aug. 17, 2020   (EP) ..................................... 20191306

(51) Int. Cl.
*G01M 13/045*     (2019.01)
*G06F 30/17*      (2020.01)

(52) U.S. Cl.
CPC ........... *G01M 13/045* (2013.01); *G06F 30/17* (2020.01)

(58) Field of Classification Search
CPC ..... F16C 19/52; F16C 19/527; G01M 13/028; G01M 13/04; G01M 13/045; G06F 30/17
See application file for complete search history.

(56) References Cited

U.S. PATENT DOCUMENTS

| 5,511,422 A * | 4/1996 | Hernandez ............ F16C 19/527 73/659 |
| 6,526,831 B2 * | 3/2003 | Ben-Romdhane .......................... G01M 13/028 73/660 |
| 7,421,349 B1 * | 9/2008 | Stack ..................... G01H 1/003 702/56 |

(Continued)

FOREIGN PATENT DOCUMENTS

| CN | 109061474 A | 12/2018 |
| CN | 109238698 A | 1/2019 |

(Continued)

OTHER PUBLICATIONS

Howard, Ian; "A Review of Rolling Element Bearing: Vibration Detection, Diagnosis and Prognosis"; Defence Science and Technology Organisation (DSTO) and Aeronautical & Maritime Research Laboratory; Melbourne, Australia; Oct. 1, 1994; 109 Pages.

(Continued)

*Primary Examiner* — Huy Q Phan
*Assistant Examiner* — Martin Walter Braunlich
(74) *Attorney, Agent, or Firm* — Whitmyer IP Group LLC

(57) ABSTRACT

A method of detecting a bearing fault of a rolling element bearing mounted around a shaft, using a shaft displacement sensor providing a shaft displacement signal to detect shaft displacement, the method including: a) subtracting a modelled shaft displacement reference signal from the shaft displacement signal to obtain a residual vector, b) estimating (Continued)

for at least one bearing fault type a respective bearing fault frequency, and estimating, for each bearing fault type, an amplitude of the residual vector in a frequency range containing a bearing fault frequency of the associated bearing fault type, and d) determining whether a bearing fault is present based on the at least one estimated amplitude.

19 Claims, 2 Drawing Sheets

(56) References Cited

U.S. PATENT DOCUMENTS

| | | | | |
|---|---|---|---|---|
| 7,716,018 | B2* | 5/2010 | Pecher | G01P 3/443 |
| | | | | 702/190 |
| 7,930,111 | B2* | 4/2011 | Luo | F16C 19/527 |
| | | | | 702/33 |
| 10,520,397 | B2* | 12/2019 | Gao | G01M 99/008 |
| 10,598,568 | B1* | 3/2020 | Morey | G01M 13/045 |
| 11,099,101 | B2* | 8/2021 | Wang | G01M 13/04 |
| 11,898,932 | B2* | 2/2024 | Zhu | G01M 13/045 |
| 2016/0327452 | A1 | 11/2016 | Vilar et al. | |

FOREIGN PATENT DOCUMENTS

| | | | |
|---|---|---|---|
| CN | 110146292 A | 8/2019 | |
| EP | 2918964 A1 | 9/2015 | |
| EP | 3309530 A1 | 4/2018 | |
| JP | H02147922 A | 6/1990 | |
| JP | 2005345277 A | 12/2005 | |
| JP | 2011038557 A | 2/2011 | |
| JP | 2019045202 A | 3/2019 | |
| KR | 100758152 B1 * | 9/2007 | ............ G01M 13/04 |

OTHER PUBLICATIONS

European Search Report; Application No. 20191306.8; Completed: Jan. 21, 2021; Issued: Jan. 29, 2021; 9 Pages.

Zhang Haigang et al; On-line bearing fault monitoring based on stator current monitoring; Control Theory and Applications, vol. 32, No. 4; May 12, 2015; 8 Pages.

Chinese First Office Action; Application No. 2021109372315; Completed: Mar. 2, 2024; 24 Pages.

* cited by examiner

METHOD OF DETECTING A BEARING FAULT

TECHNICAL FIELD

The present disclosure generally relates to bearing fault detection.

BACKGROUND

Electric motors are a key component that enables modern, efficient production. For a company to globally stay competitive its motors should be running 24/7.

Today, acceleration measurement-based vibration analysis is the dominant technique used for condition monitoring of rotating electrical machines. In contrast to accelerometers, the sensitivity of capacitive displacement sensors is better in the low frequency area. That is why it may be assumed that faults appearing in the low frequency area of the vibration spectrum such as unbalance, misalignment, and eccentricity, can be detected and assessed more reliably and accurately by using displacement sensors instead of accelerometers. However, a decisive factor when considering replacing an accelerometer in condition monitoring is the ability of the displacement sensor to detect faults in the rolling element bearings, since more than half of the breakdowns of electrical motors are due to failures of the bearings.

EP2918964 A1 discloses a sensor comprising a capacitive sensor for sensing the position or motion of a shaft comprising an electrically conducting part. The sensor utilises the sensor PCB that comprises a mounting hole through which the conducting part of the shaft can be mounted, at least one capacitor electrode formed to the printed circuit board, wherein an electrode surface of the electrode extends parallel to a centre axis of the mounting hole and faces the centre axis.

SUMMARY

In the early stage of the usual bearing fault progression a macroscopic and self-propagating crack appears on the defective surface. Even in the early fault stages the depth of the local fault is several micrometres, thus detectable by an accurate shaft displacement sensor. This fault produces a series of weak impacts and displacements at a rate dependent on the bearing geometry.

If the shaft is rotating at constant speed, displacements due to a fault will occur periodically with a certain frequency, which can be calculated by the location of the fault, the bearing geometry and the shaft speed. These frequencies are known as the bearing fault frequencies and can be determined for a fault on:

the outer race,
the inner race,
the ball or roller, and
the gage.

A general object of the present disclosure is to provide a method that solves or at least mitigates the problems of the prior art.

There is hence according to a first aspect of the present disclosure provided a method of detecting a bearing fault of a rolling element bearing mounted around a shaft, using a shaft displacement sensor providing a shaft displacement signal to detect shaft displacement, the method comprising: a) subtracting a modelled shaft displacement reference signal from the shaft displacement signal to obtain a residual vector, b) estimating for at least one bearing fault type a respective bearing fault frequency, and estimating, for each bearing fault type, an amplitude of the residual vector in a frequency range containing a bearing fault frequency of the associated bearing fault type, and d) determining whether a bearing fault is present based on the at least one estimated amplitude.

Fault detection of the rolling element bearing may thereby be obtained.

One embodiment comprises c) determining a bearing fault indicator for each bearing fault frequency by comparing the corresponding estimated amplitude to a noise floor of a signal defined by the residual vector, wherein step d) involves determining whether a bearing fault is present based on the magnitude of at least one bearing fault indicator.

A very accurate bearing fault detection can thereby be obtained. A bearing fault can therefore be detected at an early stage before further progression. It furthermore reduces the risk of incorrect conclusions about bearing faults. This may be achieved because it can be determined more precisely whether the estimated amplitudes in the frequency ranges associated with the respective residual vector frequencies are random noise and thus not indicative of a bearing fault or that they are in fact generated because of a bearing fault.

The frequency ranges may be selected so that they exclude frequencies with known disturbances.

Step d) may involve determining that a bearing fault is present in case at least one of the magnitudes is greater than a threshold value.

Each bearing fault indicator may provide an indication of an associated bearing fault type, in case its magnitude is greater than a threshold value. Alternatively, the method may involve determining that a bearing fault is present, without identifying its type, by determining that one of the bearing fault indicators has a magnitude greater than a threshold value. In the latter case, the method may not analyse which one or ones of the bearing fault indicators has a magnitude greater than a threshold value.

The shaft displacement signal from the shaft displacement sensor is preferably measured during steady-state operating conditions of the shaft.

According to one embodiment step c) involves determining the noise floor based on the median of an amplitude spectrum of the signal defined by the residual vector.

The amplitude spectrum may be scaled. The amplitude spectrum may be scaled so that its scale is comparable to the scale of the estimated amplitudes.

The amplitude spectrum may be determined using a weight function, such as a Hanning window, multiplied with each term of a sum defining the amplitude spectrum. The amplitude spectrum may be normalised using a normalising factor. The normalising factor may utilise a Hanning window. Because of the scaling, the magnitude of the peaks in the amplitude spectrum will correspond in size to those of the shaft displacement signal. This facilitates comparison between the estimated amplitudes, which may be calculated by the maximum likelihood method, and the noise floor, which may be obtained using the Discrete Fourier Transform (DFT) method, to obtain proper bearing fault indicators.

According to one embodiment the comparison in step c) involves dividing the respective estimated amplitude with the noise floor.

According to one embodiment step d) involves using at least one bearing fault indicator in a sequential probability ratio method or a cumulative sum method to determine whether a bearing fault is present.

More robust decision-making may thereby be provided, which is based on a learning process involving historical values of the bearing fault indicators and their deviations from the historical values.

According to one embodiment the modelled shaft displacement reference signal is modelled by a Fourier series comprising shaft rotation speed harmonics.

The shaft rotation speed may for example be determined by measurement or estimation.

According to one embodiment step d) involves maximising the likelihood of a sinusoidal model of the residual vector in the frequency ranges containing the corresponding bearing fault frequency to estimate the residual vector frequencies and the amplitudes.

According to one embodiment the bearing fault types are at least two of the group of outer race fault, inner race fault, ball or roller fault, and gage fault.

Each bearing fault type is associated with a respective reference fault frequency. The reference fault frequencies may for example be determined empirically. Each frequency range is based on and contains the corresponding reference fault frequency.

There is according to a second aspect of the present disclosure provided a computer program comprising computer code which when executed by processing circuitry of a bearing fault detector causes the bearing fault detector to perform the method of the first aspect.

There is according to a third aspect of the present disclosure provided a bearing fault detector for detecting a bearing fault of a rolling element bearing mounted around a shaft, using a shaft displacement sensor configured to provide a shaft displacement signal to detect shaft displacement, the bearing fault detector comprising: a storage medium comprising computer code, and processing circuitry, wherein when the processing circuitry executes the computer code, the bearing fault detector is configured to: subtract a modelled shaft displacement reference signal from the shaft displacement signal to obtain a residual vector, estimate for at least one bearing fault type a respective bearing fault frequency and estimating, for each bearing fault type, an amplitude of the residual vector in a frequency range containing a bearing fault frequency of the associated bearing fault type, and determine whether a bearing fault is present based on the at least one estimated amplitude.

According to one embodiment the processing circuitry is configured to determine the noise floor based on the median of an amplitude spectrum of the signal defined by the residual vector.

According to one embodiment the processing circuitry is configured to determine the bearing fault indicators by dividing the respective estimated amplitude with the noise floor.

According to one embodiment the processing circuitry is configured to determine whether a bearing fault is present using at least one bearing fault indicator in a sequential probability ratio method or a cumulative sum method According to one embodiment the modelled shaft displacement reference signal is modelled by a Fourier series comprising shaft rotation speed harmonics.

According to one embodiment the processing circuitry is configured to estimate the residual vector frequencies and the amplitudes by maximising the likelihood of a sinusoidal model of the residual vector in the frequency ranges containing the corresponding bearing fault frequency.

There is according to a fourth aspect of the present disclosure provided a system comprising: an electrical machine comprising a rotatable shaft, a shaft displacement sensor configured to be arranged around the shaft, and a bearing fault detector according to the third aspect configured to receive a shaft displacement signal from the shaft displacement sensor.

The electrical machine may be a motor or a generator.

The shaft displacement sensor may be a capacitive sensor.

The shaft may comprise an electrically conducting part and the shaft displacement sensor may be arranged around the electrically conducting part.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIG. 4b is a graph showing the signal defined by the residual vector obtained from the signals shown in FIG. 4a.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
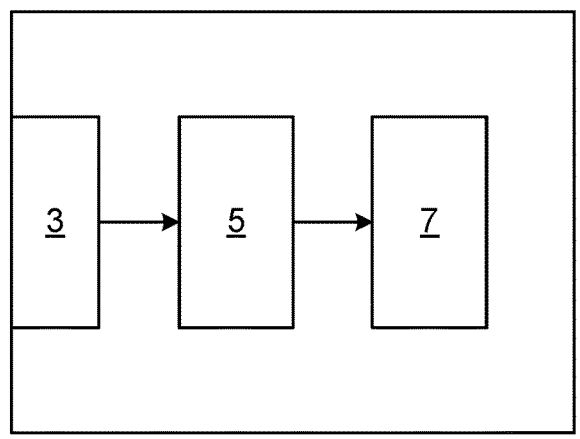
FIG. 1 schematically shows a block diagram of a bearing fault detector.

FIG. 1 depicts a block diagram of an example of a bearing fault detector 1. The bearing fault detector 1 is configured to detect a bearing fault of a rolling element bearing mounted around a shaft. The shaft may for example be a rotor shaft of an electrical machine such as a motor or generator.

The bearing fault detector 1 comprises an input unit 3 configured to receive a shaft displacement signal from a shaft displacement sensor. The bearing fault detector 1 comprises processing circuitry 5 and may comprise a storage medium 7.

The storage medium 7 may comprise a computer program which when executed by the processing circuitry 7 causes the bearing fault detector 1 to perform the method as disclosed herein.

The processing circuitry 5 may for example use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning bearing fault detection.

The storage medium 7 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Figure 2:
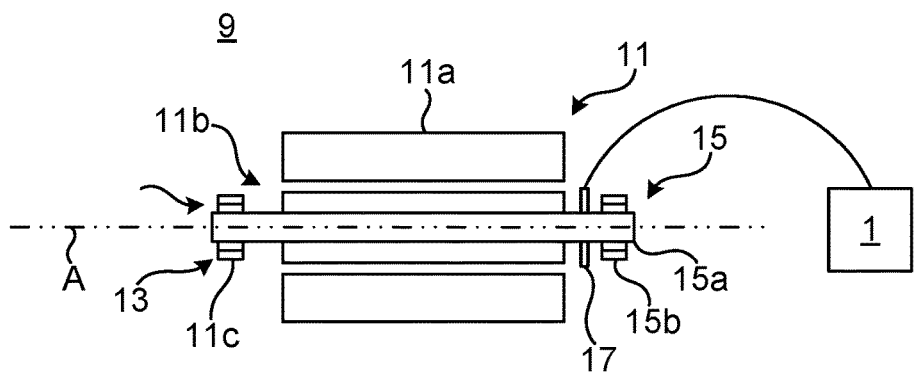
FIG. 2 schematically shows a block diagram of a system comprising the bearing fault detector in FIG. 1 and an electrical machine.

FIG. 2 shows an example of a system 9. The system 9 comprises an electrical machine 11. The electrical machine 11 is a rotating electrical machine. The electrical machine 11 may be a motor or a generator. The electrical machine 11 is shown in a longitudinal section in FIG. 2.

The electrical machine 11 comprises a stator 11a and a rotor 11b. The stator 11a and the rotor 11b are configured to electromagnetically interact with each other. The rotor 11b comprises a shaft 11c. The shaft 11c is rotatable about a longitudinal shaft axis A. The shaft axis A coincides with the Z-axis of the electrical machine 11. The electrical machine 11 also has an X-axis and a Y-axis. The X-axis and the Y-axis are radial axes with respect to the shaft 11c and the longitudinal shaft axis A.

The electrical machine 11 comprises rolling element bearings 13 and 15 attached to the shaft 11c. The rolling element bearings 13 and 15 enable rotation of the shaft 11c.

The rolling element bearing 15 has an inner bearing race 15a attached to the shaft 11c. The bearing 15 has an outer bearing race 15b attached to a support structure (not shown) which supports the rotor 11b. The rolling element bearing 13 is similar or identical to the rolling element bearing 15.

The system 9 comprises at least one shaft displacement sensor 17. The shaft displacement sensor 17 is arranged around the shaft 11c. The shaft displacement sensor 17 may for example be installed adjacent to the rolling element bearing 15. The shaft displacement sensor 17 may have a through-opening and the shaft 11c may extend through the through-opening. The shaft displacement sensor 17 may be a capacitive sensor. The shaft displacement sensor 17 may for example be of the type disclosed in EP2918964 A1.

The shaft displacement sensor 17 may be configured to detect shaft displacement along the X-axis and the Y-axis. The shaft displacement signal may comprise both X-axis displacement measurements and Y-axis displacement measurements of the shaft 11c.

The system 9 comprises the bearing fault detector 1. The bearing fault detector 1 is configured to receive the shaft displacement signal, which is a measurement signal made by the shaft displacement sensor 17. The bearing fault detector 1 may be configured to receive the shaft displacement signal by wireless communication, by wired communication or by a combination of both.

Figure 3:
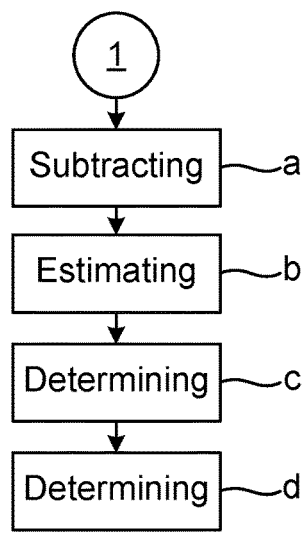
FIG. 3 is a flowchart of a method of detecting a bearing fault by means of a bearing fault detector.

A method of detecting a bearing fault of the rolling element bearing 15 by means of the bearing fault detector 1 will now be described with reference to FIG. 3.

In steady-state or stable operation of the electrical machine 11 the shaft displacement signal may be modelled using a Fourier series. The sine or cosine functions in the Fourier series include rotation speed harmonics of the fundamental frequency, which is the rotation speed of the shaft 11c. The modelled shaft displacement reference signal in the Y-direction may be expressed as follows:

$$s_y[n] = \sum_{m=1}^{M} A_m \cos(\omega_m n + \varphi_m) + \varepsilon[n]$$

The same expression applies also for the X-direction modelled shaft displacement reference signal. n is the discrete time index, M is the number of harmonics in the model, $\omega_m = 2\pi v_m$ is the m:th harmonic, $v_m = f_m/f_s$ is the digital frequency. Frequencies $f_m$ and $f_s$ are the analog signal frequency and sampling frequency, respectively, and $\varepsilon[n]$ is a noise term.

The rotation speed $\omega_1$ of the fundamental may for example be determined by measurement or estimation.

In a step a) the modelled shaft displacement reference signal $s_y[n]$ is subtracted from the shaft displacement signal y[n] obtained from the shaft displacement sensor 17. A residual vector $y_r[n]$ is thus obtained, i.e. $y_r[n]=y[n]-s_y[n]$. y[n] is the discretised shaft displacement signal.

Step a) also involves obtaining the residual vector $x_r[n]$ for the shaft displacement signal x[n] in the x-direction by subtraction with the modelled shaft displacement reference signal $s_x[n]$ in the x-direction.

In the following reference will generally only be made to the y-direction components, but the same also applies to the x-direction components.

Figure 4A:
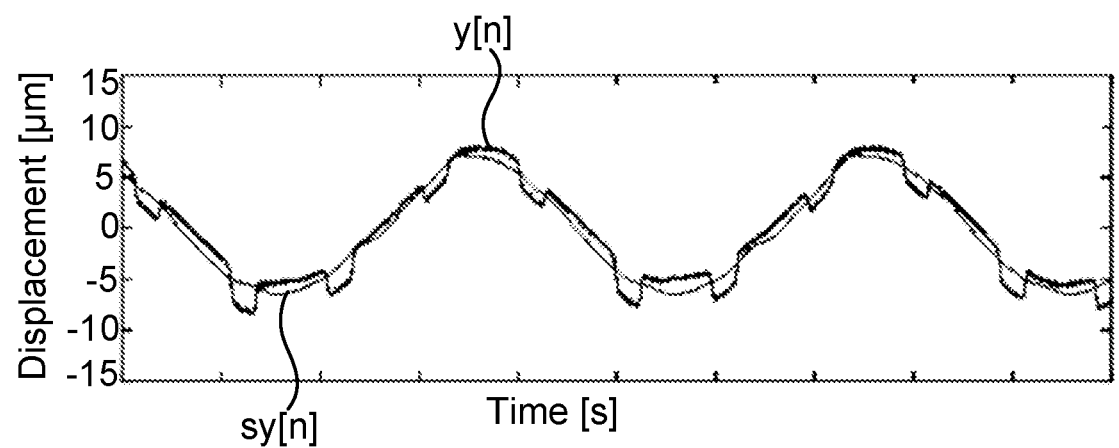
FIG. 4a is a graph showing a modelled shaft displacement reference signal and a shaft displacement signal in the presence of an outer race fault.

An example of a shaft displacement signal y[n] is shown in FIG. 4a. In the example, the rolling element bearing 15 has an outer bearing race fault indicated by the periodic pulses in the shaft displacement signal y[n]. An example of a modelled shaft displacement reference signal $s_y[n]$ is also shown in FIG. 4a.

Figure 4B:
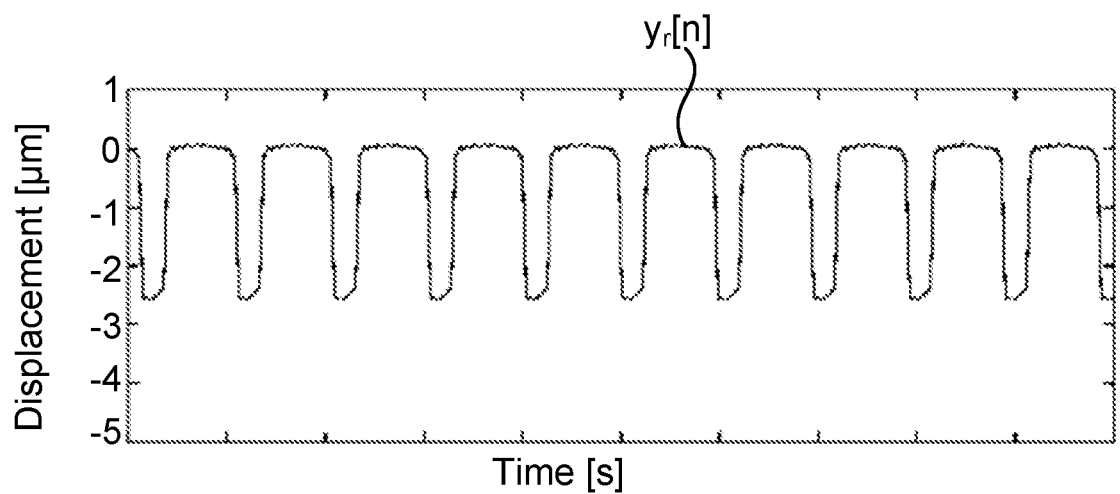

FIG. 4b shows the residual vector $y_r$ obtained when the modelled shaft displacement reference signal $s_y[n]$ has been subtracted from the shaft displacement signal y[n]. The presence of a fault may not be known at this time because there may exist small pulses in the shaft displacement signal for many reasons although the bearing is healthy. The characteristic that separates these pulses from pulses due to a bearing fault is the repetition frequency. Thus, the question is whether these periodic disturbances significantly differ from the amplitude of random noise. If the shaft 11c is rotating at constant speed, the displacement due to a fault will occur periodically at one of the bearing fault frequencies.

A value of the residual vector at each sample n is obtained by the subtraction of the modelled shaft displacement reference signal $s_y[n]$ from the shaft displacement signal y[n]. A sinusoidal model that mathematically describes the residual vector, for both x-direction and y-direction displacement, can be determined by a sum of sinusoidal functions. The sinusoidal model may be defined by a Fourier series as follows:

$$y_r[n] = \sum_{k=1}^{M} B_k^i \sin(k 2\pi f_{ff}^i n + \varphi_k^i) + z[n], n = 0, 1, 2, \ldots, N-1$$

where $f_{ff}^i$ are the fault frequencies in the case of a bearing fault. $B_k^i$ are the corresponding amplitudes, i.e. the amplitudes at the fundamental/first harmonic defined by the corresponding bearing fault frequency $f_{ff}^i$ and at corresponding upper harmonics. $\varphi_k^i$ are the corresponding phases.

In a step b) the bearing fault frequencies $f_{ff}^i$ and corresponding amplitudes $B_k^i$ of the frequency spectrum of the residual vector $y_r[n]$ are estimated. The frequency spectrum is thus that of the sinusoidal model of the residual vector $y_r[n]$. Each bearing fault frequency $f_{ff}^i$ may be estimated by maximising the likelihood of the sinusoidal model of the residual vector $y_r[n]$ in a respective frequency range $[f_{min}^i, f_{max}^i]$ each containing a known bearing fault frequency. The bearing fault frequency and corresponding amplitudes can thus be estimated for a plurality of different bearing fault types.

In an optional step step c) bearing fault indicators $FI^i$ are determined for each bearing fault frequency. The bearing fault indicators $FI^i$ are determined by comparing the corresponding first estimated amplitude, i.e. at the corresponding fundamental frequency, to a noise floor of a signal defined by the residual vector, i.e. the sinusoidal model of the residual vector. The estimated amplitudes may be divided with the median of the amplitude spectrum of the signal defined by the residual vector $y_r[n]$. The estimated amplitudes may be divided with the median of a scaled and normalised amplitude spectrum $P_{BT}^i(f)$. The amplitude spectrum is the absolute value of the discrete Fourier transform of the sinusoidal model of the residual vector, or the absolute value of a scaled discrete Fourier transform that is normalised. An example of a scaled and normalised amplitude spectrum of the sinusoidal model of the residual vector is shown below:

$$P_{BT}^i(f) = \left|\sum_{n=0}^{N-1} w_H[n] y_r[n] \exp(-j2\pi fn)\right|/\rho$$

where $w_H$ is the Hanning window and $\rho$ is the normalising factor expressed as follows:

$$\rho = \sum_{k=0}^{N-1} w_H[k]/2$$

Each bearing fault indicator $FI^i$ is the ratio between the first estimated amplitude $B_1^i$, i.e. the largest estimated amplitude, of the sinusoidal model of the residual vector $y_r[n]$ and the median of the amplitude spectrum:

$$FI^i = \frac{B_1^i}{\text{median } \{P_{BT}^i(f)\}}$$

The bearing fault indicators $FI^i$ provide a measure of the significance of the size of the estimated amplitudes compared to random noise.

In a step d) it is determined whether a bearing fault is present based on the estimated amplitude. In step d) the presence of a fault may for example be determined directly from the size or magnitude of the estimated amplitude. For example, the first estimated amplitude, i.e. the largest estimated amplitude may be used for determining the presence of a bearing fault. For example, in case the estimated amplitude has a magnitude greater than a predetermined value, it can be concluded that a bearing fault is present.

Alternatively, the presence of a bearing fault may be determined based on the magnitudes of the bearing fault indicators $FI^i$.

Step d) may involve using binary decision theory for decision-making to choose between two hypotheses, namely H0: the condition of the bearing is normal and H1: there is a bearing fault. For example, if one of the bearing fault indicators $FI^i$ has a magnitude greater than a threshold value it may be concluded that a bearing fault is present.

According to one variation, step d) may involve using the bearing fault indicators $FI^i$ in a sequential probability ratio method or a cumulative sum method to determine whether a bearing fault is present.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of detecting a bearing fault of a rolling element bearing mounted around a shaft, the method comprising the steps of:
   operating the shaft in a steady-state condition;
   connecting communicatively a fault detector to a shaft displacement sensor arranged at the shaft;
   measuring a shaft displacement via the shaft displacement sensor, which transmits a shaft displacement signal to the fault detector:
   a) subtracting, via the fault detector, a modelled shaft displacement reference signal from the shaft displacement signal to obtain a residual vector,
   b) estimating, via the fault detector, for at least one bearing fault type a respective bearing fault frequency, and estimating, for each bearing fault type, an amplitude of the residual vector in a frequency range containing a bearing fault frequency of the associated bearing fault type, and
   d) determining, via the fault detector, whether a bearing fault is present based on the at least one estimated amplitude.

2. The method as claimed in claim 1, further comprising the step of: c) determining a bearing fault indicator for each bearing fault frequency by comparing the corresponding estimated amplitude to a noise floor of a signal defined by the residual vector, wherein step d) involves determining whether a bearing fault is present based on the magnitude of at least one bearing fault indicator.

3. The method as claimed in claim 2, wherein step c) involves determining the noise floor based on the median of an amplitude spectrum of the signal defined by the residual vector.

4. The method as claimed in claim 2, wherein the comparison in step c) involves dividing the respective estimated amplitude with the noise floor.

5. The method as claimed in claim 2, wherein step d) involves using at least one bearing fault indicator in a sequential probability ratio method or a cumulative sum method to determine whether a bearing fault is present.

6. The method as claimed in claim 1, wherein the modelled shaft displacement reference signal is modelled by a Fourier series including shaft rotation speed harmonics.

7. The method as claimed in claim 1, wherein step d) involves maximising the likelihood of a sinusoidal model of the residual vector in the frequency ranges containing the corresponding bearing fault frequency to estimate the residual vector frequencies and the amplitudes.

8. The method as claimed in claim 1, wherein the bearing fault types are at least two of the group of outer race fault, inner race fault, ball or roller fault, and gage fault.

9. A computer program stored on a non-transitory computer readable storage medium and comprising computer code which when executed by processing circuitry of a bearing fault detector causes the bearing fault detector to perform a method including the steps of:

receiving a shaft displacement signal from a shaft displacement sensor which is arranged at a shaft and measures a shaft displacement, the shaft operating in a steady-state condition and having a rolling element bearing attached thereto;

a) subtracting a modelled shaft displacement reference signal from the shaft displacement signal to obtain a residual vector, b) estimating for at least one bearing fault type a respective bearing fault frequency, and estimating, for each bearing fault type, an amplitude of the residual vector in a frequency range containing a bearing fault frequency of the associated bearing fault type, and d) determining whether a bearing fault is present based on the at least one estimated amplitude.

10. A bearing fault detector for detecting a bearing fault of a rolling element bearing mounted around a shaft, the bearing fault detector comprising:

a storage medium including computer code, and
processing circuitry,
wherein when the processing circuitry executes the computer code, the bearing fault detector is configured to:
receive a shaft displacement signal from a shaft displacement sensor which is arranged at the shaft and measures a shaft displacement, the shaft operating in a steady-state condition,
subtract a modelled shaft displacement reference signal from the shaft displacement signal to obtain a residual vector,
estimate for at least one bearing fault type a respective bearing fault frequency and estimating, for each bearing fault type, an amplitude of the residual vector in a frequency range containing a bearing fault frequency of the associated bearing fault type, and
determine whether a bearing fault is present based on the at least one estimated amplitude.

11. The bearing fault detector as claimed in claim 10, wherein the processing circuitry determines a bearing fault indicator for each bearing fault frequency by comparing the corresponding estimated amplitude to a noise floor of a signal defined by the residual vector, and to determine whether a bearing fault is present based on the magnitude of at least one bearing fault indicator.

12. The bearing fault detector as claimed in claim 11, wherein the processing circuitry determines the noise floor based on the median of an amplitude spectrum of the signal defined by the residual vector.

13. The bearing fault detector as claimed in claim 11, wherein the processing circuitry determines the bearing fault indicators by dividing the respective estimated amplitude with the noise floor.

14. The bearing fault detector as claimed in claim 11, wherein the processing circuitry determines whether a bearing fault is present using at least one bearing fault indicator in a sequential probability ratio method or a cumulative sum method.

15. The bearing fault detector as claimed in claim 10, wherein the modelled shaft displacement reference signal is modelled by a Fourier series including shaft rotation speed harmonics.

16. The bearing fault detector as claimed in claim 10, wherein the processing circuitry estimates the residual vector frequencies and the amplitudes by maximising the likelihood of a sinusoidal model of the residual vector in the frequency ranges containing the corresponding bearing fault frequency.

17. A system comprising:
an electrical machine including a rotatable shaft,
a shaft displacement sensor configured to be arranged around the shaft, and
a bearing fault detector configured to receive a shaft displacement signal from the shaft displacement sensor, the bearing fault detector having:
a storage medium including computer code, and
processing circuitry,
wherein when the processing circuitry executes the computer code, the bearing fault detector is configured to:
subtract a modelled shaft displacement reference signal from the shaft displacement signal to obtain a residual vector,
estimate for at least one bearing fault type a respective bearing fault frequency and estimating, for each bearing fault type, an amplitude of the residual vector in a frequency range containing a bearing fault frequency of the associated bearing fault type, and
determine whether a bearing fault is present based on the at least one estimated amplitude.

18. The method as claimed in claim 3, wherein the comparison in step c) involves dividing the respective estimated amplitude with the noise floor.

19. The bearing fault detector as claimed in claim 12, wherein the processing circuitry determines the bearing fault indicators by dividing the respective estimated amplitude with the noise floor.

* * * * *